United States Patent
Klare et al.

(10) Patent No.: US 11,591,431 B2
(45) Date of Patent: Feb. 28, 2023

(54) MILLING BLANK FOR THE PRODUCTION OF MEDICAL-TECHNICAL MOLDED PARTS

(71) Applicant: PRO3DURE MEDICAL GMBH, Dortmund (DE)

(72) Inventors: Martin Klare, Dortmund (DE); Frank Gischer, Menden (DE)

(73) Assignee: PR03DURE MEDICAL GMBH, Dortmund (DE)

( * ) Notice: Subject to any disclaimer, the term of this patent is extended or adjusted under 35 U.S.C. 154(b) by 445 days.

(21) Appl. No.: 16/846,442

(22) Filed: Apr. 13, 2020

(65) Prior Publication Data

US 2020/0308332 A1 Oct. 1, 2020

Related U.S. Application Data

(63) Continuation-in-part of application No. 15/518,872, filed as application No. PCT/EP2015/073636 on Oct. 13, 2015, now Pat. No. 10,623,874.

(30) Foreign Application Priority Data

Oct. 14, 2014 (DE) .................. 10 2014 114 895.9

(51) Int. Cl.
*C08F 265/06* (2006.01)
*C08K 13/08* (2006.01)

(52) U.S. Cl.
CPC ............ *C08F 265/06* (2013.01); *C08K 13/08* (2013.01); *C08K 2201/014* (2013.01)

(58) Field of Classification Search
CPC ............................ C08F 265/06; C08K 13/08
USPC ........................................................ 524/81
See application file for complete search history.

(56) References Cited

U.S. PATENT DOCUMENTS

| | | |
|---|---|---|
| 4,115,346 A | 9/1978 | Gross |
| 4,575,330 A | 3/1986 | Hull |
| 4,906,446 A | 3/1990 | Engelbrecht |
| 5,487,012 A | 1/1996 | Topholm |
| 5,663,214 A | 9/1997 | Okada |
| 5,707,611 A | 1/1998 | Ikemura |
| 6,300,407 B1 | 10/2001 | Machleder |
| 2002/0090525 A1 | 7/2002 | Rusin |
| 2003/0153645 A1 | 8/2003 | Benjamin |
| 2008/0039646 A1 | 2/2008 | Storzum |
| 2013/0172441 A1 | 7/2013 | Takahata |
| 2015/0165097 A1 | 6/2015 | Parthasarathy |
| 2017/0156990 A1* | 6/2017 | Ruppert .............. A61F 2/30942 |

FOREIGN PATENT DOCUMENTS

| | | | |
|---|---|---|---|
| DE | 10011665 | 9/2000 | |
| DE | 19961341 | 6/2001 | |
| DE | 10147125 | 4/2002 | |
| DE | 102012022693 | 5/2014 | |
| EP | 0410034 | 1/1991 | |
| EP | 1702633 | 9/2006 | |
| WO | 2001087001 | 11/2001 | |
| WO | WO-2016001242 A1 * | 1/2016 | ............ A61C 1/084 |

OTHER PUBLICATIONS

A. Gärtner "Weichmacher (DEHP) in Medizinprodukten" [Plasticizers (DEHP) in Medical Products]; mt-medizintechnik; Mar. 2007; TUEV Media Verlag Köln, pp. 92-102).
International Preliminary report on Patentability for Application No. PCT/EP2015/073636 dated Apr. 27, 2017.
International search report for application No. PCT/EP2015/073636 dated Feb. 5, 2016.
Otoplastik: Die individuelle Otoplastik zur Hörgeräteversorgung und als persönlicher Gehörschutz im Lärm, 4. überarbeitete Auflage (2013), S. 18 ff. von Voogdt ["Otoplastic: The individual otoplastic for hearing aid provision and as personal hearing protection in noisy environments", 4th revised edition (2013), p. 18 ff. by Voogdt].

* cited by examiner

*Primary Examiner* — Deve V Hall
(74) *Attorney, Agent, or Firm* — JMB Davis Ben-David

(57) ABSTRACT

This disclosure relates to a milling blank for the production of medical-technical molded parts, in particular dental splints or ear molds, as well as a method for the production of such a blank.

20 Claims, 3 Drawing Sheets

MILLING BLANK FOR THE PRODUCTION OF MEDICAL-TECHNICAL MOLDED PARTS

CROSS-REFERENCE TO RELATED APPLICATIONS

This is a Continuation-in-Part of U.S. patent application Ser. No. 15/518,872, filed Apr. 13, 2017, which is the US National Stage of International Patent Application No. PCT/EP2015/073636, filed Oct. 13, 2015, which in turn claimed priority to German Patent Application No. 10 2014 114 895.9, filed Oct. 14, 2014. The foregoing patent applications are incorporated by reference herein in their entirety.

FIELD

The invention relates to a milling blank for the production of medical-technical molded parts, in particular dental splints or ear molds, as well as a method for the production of such a blank.

BACKGROUND OF THE INVENTION

Blanks for the production of medical-technical molded parts of the initially named type are known in various designs from the prior art. Both dental splints as well as ear molds are currently produced substantially by means of two different methods of the prior art.

In the case of the first method known from the prior art, an impression of the positive (tooth crown or ear canal) is taken in a first step. Then, in the case of a dental splint, a positive plaster model is produced from the impression, on which then e.g. a splint (negative) is deep-drawn or a 2-component material is applied by means e.g. of a spreading technology and is then hardened. In the case of the so-called PNP process (positive-negative-positive) for the production of ear molds, the hearing aid acoustician takes in a first step an ear impression (positive) for the production of an otoplasty (for devices worn behind the ear) or a shell (for devices worn in the ear). In a second step, a negative mold (N) is prepared by means of the impression, into which either a radiation-curable or an autopolymerizing, low-viscosity formulation is subsequently poured. It is then hardened by means of heat in a pressure pot or by means of radiation.

The dental splint (negative) prepared in this manner or the ear mold (positive) must be optimally fitted for the anatomical conditions. Inaccurate molds would otherwise cause discomfort (e.g. pressure points, poor hold) and impair the function of the splint or hearing aid (e.g. misaligned teeth/feedback). As a result, it is important that the formulation has the lowest viscosity possible so that even undercuts and the finest surface textures are filled in with material and can be formed as true to detail as possible.

Additive layer processes such as e.g. stereolithography, are used as another method group of the prior art for the production of splints/ear molds, which functions based on digital data. It is thereby known from publication U.S. Pat. No. 4,575,330 that low-viscosity, radiation-curable resins or respectively resin mixes can be used for the production of three-dimensional objects by means of stereolithography. Furthermore, it is known from publications U.S. Pat. No. 5,487,012 and WO 01/87001 that the stereolithography can be used advantageously for the production of ear-pieces.

In the case of the stereolithographic method, three-dimensional objects made of a low-viscosity, radiation-curable formulation are structured in a manner that respectively one thin layer (approx. 25-100 µm) of the formulation is pre-cured by means of actinic radiation in a defined manner such that the created layer has the desired cross-sectional shape of the object at this position. The created layer is simultaneously polymerized on the layer cured in the previous step. The structure of the overall object can thus be accomplished with the help of a computer-controlled laser system such as e.g. an Nd:YVO$_4$ solid-state laser (Viper si$^2$ SLA System, 3D Systems, USA). The generated mold is postcured, if necessary, e.g. through radiation.

Special demands are made of the resin formulations that can be used in the stereolithographic process. In particular, the radiation sensitivity and the viscosity of the resin formulations as well as the strength of the molds precured by means of the laser curing should thereby be named. This not fully cured mold is called a green compact in stereolithographic technology and the strength of this green compact, characterized by the E Modulee and the bending strength, is called green strength. The green strength is an important parameter in the practical application of stereolithography, since molds with a low green strength are deformed under their own weight during the stereolithography process or can sink or bend during the postcuring, for example with a xenon arc or halogen lamp.

Furthermore, for process-related reasons, the green compacts are built on supporting structures called supports. These supports must position the green compact in a stable manner during the entire production process since the position of the green compacts must not change due to the coating process. Accordingly, the supports for a stereolithographic process can only have a minimal flexibility.

For all of these reasons, it is only possible in a very limited manner to generate flexible ear molds on the basis of three-dimensional data. For one, it is necessary for the stereolithographic process to use the lowest-viscosity resins (<3 Pa s) possible. For this reason, certain material classes, such as silicone materials or highly filled composites, are not accessible or only accessible to a very limited degree.

This also applies to systems that have a so-called temperature-induced memory effect. However, this effect is useful for many medical-technical applications and is even essential for new applications. For example, a dental splint can be twisted during insertion in the mouth. Through the memory effect induced by the body heat, it is then molded back into the optimal position while it is worn. This considerably increases the wear comfort and prevents the generation of defective positions in comparison to a hard, deformed material.

SUMMARY OF THE INVENTION

Thus, the object of the invention is to provide a blank as well as a method for the production of a blank by means of which medical-technical molded parts, in particular dental splints or ear molds, can be produced in a simple and particularly precise manner, which parts furthermore have a temperature-induced memory effect.

The object is solved according to the invention by a blank as disclosed herein as well as a method. Advantageous further embodiments of the invention are also specified herein.

The milling blank according to the invention made of a material produced from at least two components for the production of medical-technical molded parts, in particular dental splints or ear molds, has as a first component A a poly(alkyl methacrylate) polymer, in particular a poly(alkyl methacrylate) polymer powder, and as a second component B at least one monomer, in which the poly(alkyl methacrylate) polymer of component A is at least partially, preferably completely, soluble, in particular an alkyl acrylate and/or an alkyl methacrylate monomer. Furthermore, the material contains a flexibilizer as a further component.

Due to the fact that biometric data for a plurality of medical-technical applications is increasingly available today and a digital workflow is not yet available for such materials, the invention allows to provide in an advantageous manner particularly easily machinable milling blanks for e.g. dental or respectively orthopedic jaw splints or ear molds, in particular based on three-dimensional data, in which the surface of the blanks is not smeared during the milling and the end product has a temperature-dependent memory effect. It is thus ensured that e.g. the ear mold can be inserted into the ear canal at room temperature in the hard elastic state and the deformation of the ear mold induced by the insertion (usually turning in) returns to the original state due to the body heat.

A milling blank is generally understood as a body made of a millable material, which can have any shape initially. The body is thereby preferably free of hollow spaces and/or is formed in a materially homogenous manner. Further preferably, the body has a smooth surface and/or a compact shape.

A material made of at least two components is a material that is formed by the mixture of the components, in particular through a chemical reaction of respectively at least one substance contained in the at least two components. Each of the at least two components can thereby be made of a single substance or can be made of a mixture of substances.

Component A is preferably substantially solid and/or component B is substantially liquid so that component A can be particularly easily dissolved in the liquid component B and can thereby be processed into a casting material.

The dissolving of one component in the other, in particular of component A in component B, is generally any process, in which the substance and/or particles of the one component are evenly distributed in the other component. In particular, in this context, the creation of a fine dispersion or respectively suspension can also be understood as dissolving.

An aspect of the invention relates to a milling blank for producing medical-technical molded parts. The milling blanc is made from a material produced from at least two components, wherein a) a first component A comprises
   a poly(alkyl methacrylate) polymer, a poly(alkyl acrylate) polymer, a poly(cycloalkyl methacrylate) polymer, a poly (cycloalkyl acrylate) polymer, or a copolymer made of at least two different monomers selected from an alkyl methacrylate, an alkyl acrylate, a cycloalkyl methacrylate and a cycloalkyl acrylate, wherein the polymer or monomer of the first component A may optionally be substituted by at least one $C_{1-4}$ alkyl, —OH or $C_{1-4}$ alcohol; and wherein b) a second component B comprises
   at least one monomer, in which the polymer or copolymer of component A is at least partially soluble, wherein the monomer is selected from a compound of formula 1,

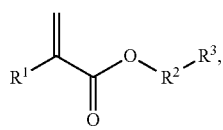

(1)

wherein
$R^1$ is —H or —$CH_3$,
$R^2$ is selected from,

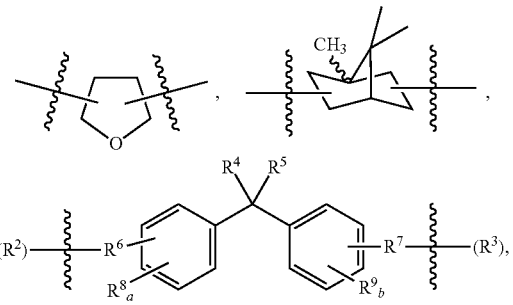

$C_{1-10}$-alkyl, and —$[(CH_2)_m$—O—$]_n$—$(CH_2)_r$—, wherein
   $R^4$ and $R^5$ are independently selected from H, —$C_{1-4}$-alkyl, —$CF_3$, phenyl, or
   $R^4$ and $R^5$ form a ring comprising a hydrocarbon chain comprising 4 to 8 carbon atoms,
   $R^6$ is selected from —$[(CH_2)_p$—O—$]_q$—,
   $R^7$ is selected from —O—$[(CH_2)_v$—O—$]_w$—,
   $R^8_a$ and $R^9_b$ are independently selected from —$C_{1-4}$-alkyl, phenyl,
   m, n, p, q, r, v and w are independently selected from 1, 2, 3 and 4,
   a is 0 or 1,
   b is 0 or 1, and
$R^3$ is —H, acrylat or methacrylate;
characterized in that
at least one monomer of the second component B is 2-ethoxyethyl methacrylate or 2-ethoxyethyl acrylate.

The milling blank is made of a powder component and a liquid component. These components are characterized by easy handling and shelf life, as the individual components within the powder component and within the liquid component do not usually react with each other. Only when the powder and liquid components are mixed, a polymerization reaction is initiated, which results in the material described above. In the polymerization reaction, the monomers react in a radical chain reaction to form polymers which form an interpenetrating network with the polymers of the powder component.

The use of 2-ethoxyethyl methacrylate or 2-ethoxyethyl acrylate has the effect that the material shows a thermomemory effect. The thermomemory effect is observed particularly at body temperature, i.e. at 37° C.

The powder component may comprise a polymer or a copolymer. In contrast to acrylate compounds, methyl acrylate compounds have a lower allergenic and sensitizing potential and thus show a higher biocompatibility. For this reason, methacrylate compounds in particular are used in the dental context because they are better tolerated by the patient.

In some embodiments, the polymer is selected from a polyalkyl methacrylate and a polycycloalkyl methacrylate.

In some embodiments, the copolymer is selected from an alkyl methacrylate and a cycloalkyl methacrylate.

In some embodiments, the polymer is a mixture of two polymers or a polymer and a copolymer, in particular of two polymers.

The addition of an initiator (catalyst) improves the polymerization ability of the monomers contained in the liquid component. After mixing the powder and liquid components, the initiator forms a radical. The radical formation is initiated by the activator contained in the liquid component.

In some embodiments, the component A comprises an initiator.

The poly(alkyl methacrylate) polymer can generally be any polymer, the monomers of which comprise an alkyl methacrylate. This also generally includes all copolymers. However, the poly(alkyl methacrylate) polymer is preferably exclusively made of alkyl methacrylate monomers.

A polymer powder is a fine, granular mixture of the polymer, wherein the average grain size is preferably less than 1 mm, particularly preferably less than 500 μm and most preferably less than 100 μm.

The component B comprises at least one monomer. After mixing the components A and B, the monomers of the liquid component form polymers by a radical polymerization reaction.

In some embodiments, the component B comprises an activator (catalyst).

As described above, methacrylate compounds are characterized by a low sensitization potential.

A monomer is generally any chemical substance, which can be brought to polymerize with each other or under the addition of an additive. A monomer can generally also already be a dimer or a oligomer of a substance, which continues to be polymerization-capable.

In some embodiments, $R^1$ is $-CH_3$.

In some embodiments, $R^2$ is selected from

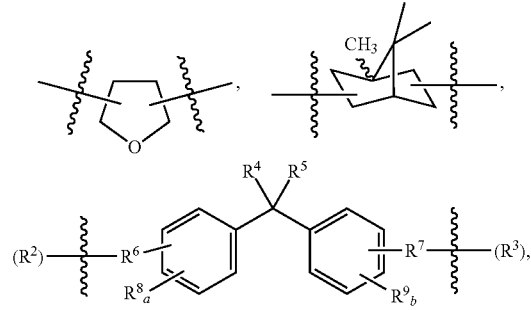

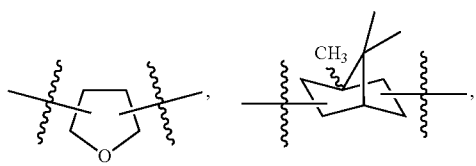

$C_{1-10}$-alkyl, $-[(CH_2)_m-O-]_n-(CH_2)_r-$, wherein
$R^4$ and $R^5$ are independently selected from H, $-C_{1-4}$-alkyl, $-CF_3$, phenyl,
$R^6$ is selected from $-[(CH_2)_p-O-]_q-$,
$R^7$ is selected from $-O-[(CH_2)_v-O-]_w-$,
$R^8_a$ and $R^9_b$ are independently selected from $-C_{1-4}$-alkyl, phenyl,
m, p, v are selected from 1, 2, 3 and 4, in particular 1 or 2,
n, q, w are selected from 1, 2, 3 and 4,
r is selected from 1, 2, 3 and 4, in particular 1 or 2,
a is 0 or 1,
b 0 oder 1 ist.

The moieties $R^4$ and $R^5$ as well as the moieties $R^8$ and $R^9$ are independently selected, that means, the moieties may be identical (e.g. both $R^4$ and $R^5$ are $-CH_3$) or different from each other (e.g. $R^4$ is $-H$ and $R^5$ is $-CH_3$).

In some embodiments, $R^2$ is selected from

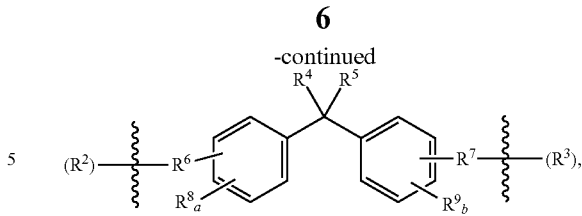

$C_{1-10}$-alkyl, $-[(CH_2)_m-O-]_n-(CH_2)_r-$, wherein
$R^4$ and $R^5$ are independently selected from H, $-C_{1-4}$-alkyl, $-CF_3$, in particular H, $-C_{1-4}$-alkyl,
$R^6$ is selected from $-[(CH_2)_p-O-]_q-$,
$R^7$ is selected from $-O-[(CH_2)_v-O-]_w-$,
$R^8_a$ and $R^9_b$ are independently selected from $-C_{1-4}$-alkyl,
m, p, v are selected from 1, 2, 3 and 4, in particular 1 or 2,
n, q, w are selected from 1, 2, 3 and 4,
r is selected from 1, 2, 3 and 4, in particular 1 or 2,
a is 0 or 1,
b is 0 or 1.

In some embodiments, $R^2$ is selected from

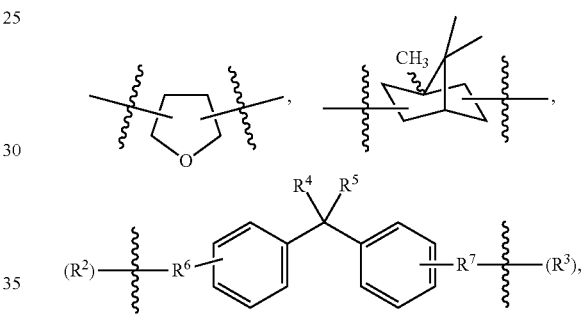

$C_1$-bis $C_{10}$-alkyl, $-[(CH_2)_m-O-]_n-(CH_2)_r-$, wherein
$R^4$ and $R^5$ are independently selected from H and $-C_{1-4}$-alkyl, in particular H and $-CH_3$,
$R^6$ is selected from $-[(CH_2)_p-O-]_q-$,
$R^7$ is selected from $-O-[(CH_2)_v-O-]_w-$,
m, p, v is 1 or 2, ist,
n, q, w is 1, 2, 3 or 4,
r is 1 or 2.

In some embodiments, $R^4$ and $R^5$ are identical.

Within the formulas, $R^6$ and $R^7$ are placed as follows:
$R^6$: $R^2-[(CH_2)_p-O-]_q$-phenyl ring
$R^7$: phenyl ring-O-$[(CH_2)_v-O-]_w-R^3$.

In some embodiments, $R^2$ is selected from

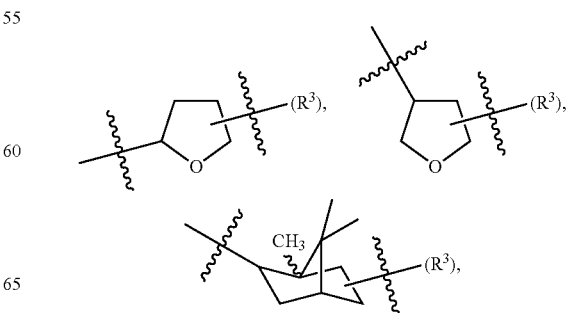

-continued

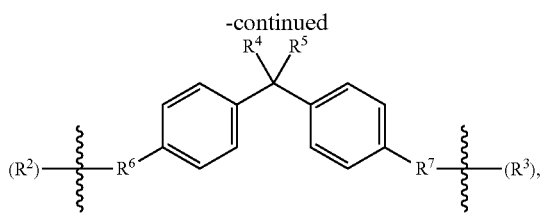

$C_{1-10}$-alkyl, $-[(CH_2)_m-O-]_n-(CH_2)_r-$, wherein
$R^4$ and $R^5$ are independently selected from H and $-C_{1-4}$-alkyl, in particular H and $-CH_3$,
$R^6$ is selected from $-[(CH_2)_p-O-]_q-$,
$R^7$ is selected from $-O-[(CH_2)_v-O-]_w-$,
m, p, v are 1 or 2,
n, q, w are 1, 2, 3 or 4,
r is 1 or 2.

In some embodiments, $R^2$ is selected from

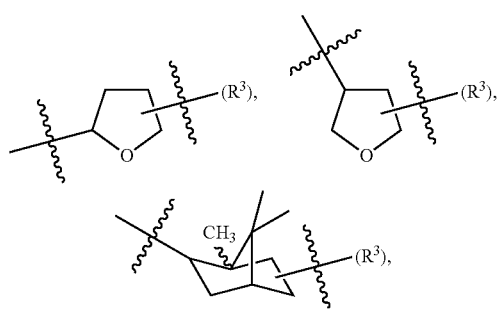

$C_{1-10}$-alkyl, $-[(CH_2)_m-O-]_n-(CH_2)_r-$, wherein m, n and r are 1, 2, 3 or 4.

In some embodiments, $R^2$ is selected from

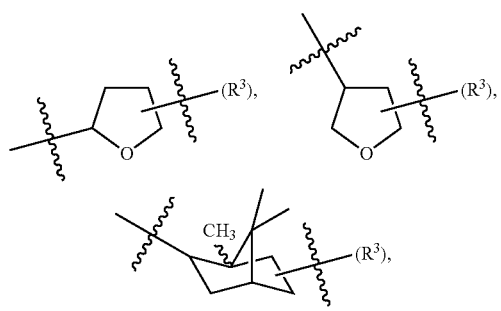

$C_{1-10}$-alkyl, $-[(CH_2)_m-O-]_n-(CH_2)_r-$, wherein m is 1 or 2, n is 1, 2, 3 or 4 and r is 1 or 2.

The flexibilizer can first be any flexibilizer or respectively plasticizer known from the prior art.

A thermomemory effect may also be achieved without the use of a flexibilizer if at least one monomer of the second component B is 2-ethoxyethyl methacrylate or 2-ethoxyethyl acrylate.

In some embodiments, $R^3$ is $-H$ or methacrylate.

In some embodiments, the compound of formula 1 is selected from methyl methacrylate, ethyl methacrylate, ethyl acrylate, 2-ethoxyethyl acrylate, 2-ethoxyethyl methacrylate, isodecyl methacrylate, isodecyl acrylate, hexanediol dimethacrylate, hexanediol diacrylate, tetrahydrofurfuryl methacrylate, tetrahydrofurfuryl acrylate, tetraethylene glycol dimethacrylate, tetraethylene glycol diacrylate, isobornyl acrylate, isobornyl methacrylate, bisphenol A-ethoxylate(2)dimethacrylate, bisphenol A-ethoxylate(4) dimethacrylate, bisphenol A-propoxylate(2)dimethacrylate, bisphenol A-propoxylate(4)dimethacrylate, Bisphenol F-ethoxylate(2)dimethacrylate and bisphenol F-ethoxylate (4)dimethacrylate, bisphenol F-propoxylate(2)dimethacrylate, bisphenol F-propoxylate(4)dimethacrylate.

In some embodiments, the compound of formula 1 is selected from ethyl methacrylate, ethyl acrylate, 2-ethoxyethyl acrylate, 2-ethoxyethyl methacrylate, isodecyl methacrylate, isodecyl acrylate, hexanediol dimethacrylate, hexanediol diacrylate, tetrahydrofurfuryl methacrylate, tetrahydrofurfuryl acrylate, tetraethylene glycol dimethacrylate, tetraethylene glycol diacrylate, isobornyl acrylate, isobornyl methacrylate, bisphenol A-ethoxylate(2)dimethacrylate, bisphenol A-ethoxylate(4)dimethacrylate, bisphenol A-propoxylate(2)dimethacrylate, bisphenol A-propoxylate(4)dimethacrylate, Bisphenol F-ethoxylate(2) dimethacrylate and bisphenol F-ethoxylate(4) dimethacrylate, bisphenol F-propoxylate(2)dimethacrylate, bisphenol F-propoxylate(4)dimethacrylate.

In some embodiments, the compound of formula 1 is selected from ethyl methacrylate, ethyl acrylate, 2-ethoxyethyl acrylate, 2-ethoxyethyl methacrylate, isodecyl methacrylate, isodecyl acrylate, hexanediol dimethacrylate, hexanediol diacrylate, tetrahydrofurfuryl methacrylate, tetrahydrofurfuryl acrylate, tetraethylene glycol dimethacrylate, tetraethylene glycol diacrylate, isobornyl acrylate, isobornyl methacrylate.

In some embodiments, the compound of formula 1 is selected from ethyl methacrylate, 2-ethoxyethyl methacrylate, tetraethylene glycol dimethacrylate.

It is known to the expert that methyl acrylate, methyl methacrylate or a mixture thereof as the sole monomer of the liquid component leads to spontaneous swelling, so that the material cannot be processed.

In some embodiments, the component B does not include methyl acrylate, methyl methacrylate or a mixture thereof as the sole monomer.

A thermoelasticity covering the range from 35° C. to 37° C. can be achieved by using 2-ethoxyethyl methacrylate or 2-ethoxyethyl acrylate.

According to an advantageous embodiment of the invention, component A comprises at least one poly(ethyl methacrylate) polymer (PEMA) or a poly(ethyl methacrylate) poly(methyl methacrylate) copolymer (PEMA-PMMA), in particular at least one PEMA powder or PEMA copolymer powder, whereby the milling blank can be produced in a particularly simple and particularly cost-effective manner and, moreover, has beneficial properties for medical-technical molded parts. Furthermore, other polymer powders such as PMMA poly(methyl methacrylate) in combination with the PEMA polymer powder can also be used.

In some embodiments, the polymer is selected from poly-$C_{1-10}$-alkyl methacrylate, poly-$C_{1-10}$-alkyl acrylate, poly-$C_{3-18}$-cycloalkyl methacrylate and poly-$C_{3-18}$-cycloalkyl acrylate.

In some embodiments, the copolymer is made of at least two monomers selected from $C_{1-10}$-alkyl methacrylate, $C_{1-10}$-alkyl acrylate, $C_{3-18}$-cycloalkyl methacrylate and $C_{3-18}$-cycloalkyl acrylate.

In some embodiments, the polymer is selected from poly-$C_{1-10}$-alkyl methacrylate, poly-$C_{1-10}$-alkyl acrylate, poly-$C_{3-18}$-cycloalkyl methacrylate and poly-$C_{3-18}$-cycloalkyl acrylate and the copolymer is made of at least two monomers selected from $C_{1-10}$-alkyl methacrylate, $C_{1-10}$-alkyl acrylate, $C_{3-18}$-cycloalkyl methacrylate and $C_{3-18}$-cycloalkyl acrylate.

In some embodiments, the polymer is selected from polyethyl methacrylate, polyethyl acrylate, isobornyl acrylate, isobornyl methacrylate, cyclohexyl acrylate, cyclohexyl methacrylate, tricyclodecane dimethanol acrylate and tricyclodecane dimethanol methacrylate.

In some embodiments, the polymer is selected from polyethyl methacrylate and polyethyl acrylate.

In some embodiments, the copolymer is prepared from at least two monomers, in particular two monomers selected from $C_{1-10}$ alkyl methacrylate, $C_{1-10}$ alkyl acrylate, $C_{3-18}$ cycloalkyl methacrylate and $C_{3-18}$ cycloalkyl acrylate.

In some embodiments, the copolymer is prepared from at least two monomers, in particular two monomers selected from $C_{1-10}$ alkyl methacrylate, $C_{1-10}$ alkyl acrylate, $C_{6-10}$ cycloalkyl methacrylate and $C_{6-10}$ cycloalkyl acrylate.

In some embodiments, the copolymer is prepared from at least two monomers, in particular two monomers selected from methyl methacrylate, methyl acrylate, ethyl methacrylate, ethyl acrylate, isobornyl acrylate, isobornyl methacrylate, cyclohexyl acrylate, cyclohexyl methacrylate, tricyclodecane dimethanol acrylate and tricyclodecane dimethanol methacrylate.

In some embodiments, the copolymer is prepared from at least two monomers, in particular two monomers selected from methyl methacrylate, methyl acrylate, ethyl methacrylate and ethyl acrylate.

In some embodiments, the copolymer is prepared from methyl methacrylate and ethyl methacrylate.

The above mentioned polymers and copolymers may be substituted by at least one $C_{1-4}$ alkyl, —OH or $C_{1-4}$ alcohol.

In some embodiments, the proportion by weight of ethyl methacrylate of the copolymer in relation to the weight of the powder component A is greater than the proportion by weight of methyl methacrylate of the copolymer in relation to the weight of the powder component A, in particular the proportion by weight of methyl methacrylate of the copolymer in relation to the weight of the powder component A≤being 40%.

In some embodiments, the proportion by weight of ethyl methacrylate of the copolymer relative to the weight of the powder component A is greater than the proportion by weight of methyl methacrylate of the copolymer relative to the weight of the powder component A, in particular the proportion by weight of methyl methacrylate of the copolymer relative to the weight of the powder component 'A≤being 25%.

In some embodiments, the proportion by weight of ethyl methacrylate of the copolymer relative to the weight of the powder component A is >50%.

In some embodiments, the weight proportion of ethyl methacrylate of the copolymer in relation to the weight of the powder component A is >70%.

In some embodiments, the powder component A comprises a mixture of two polymers. For example, ethyl methacrylate polymers and methyl methacrylate polymers may be blended.

In some embodiments, the proportion by weight of a polymer (excluding methyl methacrylate and methyl acrylate) in relation to the weight of the powder component A is greater than the proportion by weight of methyl methacrylate and/or methyl acrylate, in particular methyl methacrylate, in relation to the weight of the powder component A, the proportion by weight of methyl methacrylate and/or methyl acrylate, in particular methyl methacrylate, in relation to the weight of the powder component ≤being 40%, in particular ≤being 25%.

In some embodiments, the proportion by weight of ethyl methacrylate in relation to the weight of the powder component A is greater than the proportion by weight of methyl methacrylate in relation to the weight of the powder component A, in particular the proportion by weight of methyl methacrylate in relation to the weight of the powder component A ≤being 40%.

In some embodiments, the proportion by weight of ethyl methacrylate in relation to the weight of the powder component A is greater than the proportion by weight of methyl methacrylate in relation to the weight of the powder component, in particular the proportion by weight of methyl methacrylate in relation to the weight of the powder component A ≤being 25%.

In some embodiments, the proportion by weight of ethyl methacrylate relative to the weight of the powder component A is >50%.

In some embodiments, the proportion by weight of ethyl methacrylate in relation to the weight of the powder component A is >70%.

According to a preferred further embodiment of the invention, component A consists up to at least 50%, preferably 60% and particularly preferably 70% with respect to the mass of component A of poly(ethyl methacrylate) polymer or copolymer.

In some embodiments, component A is made up of at least 50%, in particular at least 60%, more particularly at least 70%, with respect to the mass of component A of poly(ethyl methacrylate) polymer poly(alkyl acrylate) polymer, poly (cycloalkyl methacrylate) polymer, poly (cycloalkyl acrylate) polymer or copolymer According to a particularly preferred further embodiment of the invention, component A is made, except for a smaller share of additives, in particular of up to at least 90% and particularly preferably up to at least 95% with respect to the mass of component A of poly(ethyl methacrylate) polymer or poly(ethyl methacrylate) copolymer.

In some embodiments, component A is made up of at least 90%, in particular at least 95%, with respect to the mass of component A of poly(ethyl methacrylate) polymer poly (alkyl acrylate) polymer, poly(cycloalkyl methacrylate) polymer, poly (cycloalkyl acrylate) polymer or copolymer.

According to a preferred embodiment of the invention, the mass fraction of the polymer powder made of poly(ethyl methacrylate) polymer or poly(ethyl methacrylate) poly (methyl methacrylat) copolymer is at least 25%, preferably at least 45% and particularly preferably at least 50% of the total mass of the milling blank.

According to an advantageous further embodiment of the invention, component A comprises a catalyst, in particular an organic peroxide like benzoyl peroxide and/or toluidine, or barbituric acid or respectively a barbituric acid derivate, wherein the catalyst is preferably present in a concentration of 0.25-1 percent by weight. The admixing of a catalyst thereby improves in an advantageous manner the polymerization capability of the monomers contained in component B.

An initiator (catalyst) is needed to start the polymerization reaction after mixing the powder and liquid components in the production of a thermoelastic material. If the material is used in conventional dental polymerization apparatus, initiators with a one-hour half-life at temperatures below 100° C. are suitable.

In some embodiments, component A comprises a catalyst (initiator of the radical chain reaction), wherein the catalyst is present in a concentration of 0.25-1 percent by weight in relation to the mass of the component A.

According to a further embodiment, a catalyst belonging to the group of barbituric acids and their derivates is preferred in the formulations according to the invention. In this case, the substances named in the following nonrestrictive list of barbituric acid derivates are particularly well applicable: barbituric acid, 1,3-dimethylbarbituric acid, 1,3-diphenylbarbituric acid, 1,5-dimethylbarbituric acid, 5-butylbarbituric acid, 5-ethylbarbituric acid, 5-isopropylbarbituric acid, 5-cyclohexylbarbituric acid, 1,3,5-trimethylbarbituric acid, 1,3-dimethyl-5-ethylbarbituric acid, 1,3-dimethyl-n-butylbarbituric acid, 1,3-dimethyl-5-isobutylbarbituric acid, 1,3-dimethyl-5-tertbutylbarbituric acid, 1,3-dimethyl-5-cyclopentylbarbituric acid, 1,3-dimethyl-5-cyclohexylbarbituric acid, 1,3-dimethyl-5-phenylbarbituric acid, 1-cyclohexyl-5-ethylbarbituric acid, 1-benzyl-5-phenylbarbituric acid and thiobarbituric acids as well as their salts. These compounds and applications are described in the publications U.S. Pat. Nos. 5,707,611, 5,663,214, 4,906,446 and 4,115,346.

According to a further embodiment of the invention, the alkyl acrylate and/or alkyl methacrylate monomer of component B is at least one monomer of the group methyl methacrylate, ethyl methacrylate, ethyl acrylate, ethoxyethyl acrylate, tetrahydrofurfuryl methacrylate, tetrahydrofurfuryl acrylate, isobornyl acrylate and/or isobornyl methacrylate and preferably ethoxyethyl methacrylate. However, the list of alkyl acrylate and/or alkyl methacrylate monomers should be considered nonrestrictive. They can also be used in combination and/or formulated with other compounds from the group of the acrylates or methacrylates. This includes for example: bisphenol-A-ethoxylate(2)dimethacrylate, bisphenol-A-ethoxylate(4)dimethacrylate, bisphenol-A-propoxylate(2)dimethacrylate, bisphenol-A-propoxylate(4)dimethacrylate as well as dimethacrylates of the (n)-alkoxylized bisphenol F like bisphenol-F-ethoxylate(2)dimethacrylate and bisphenol-F-ethoxylate(4)dimethacrylate, bisphenol-F-propoxylate(2)dimethacrylate, bisphenol-F-propoxylate(4) dimethacrylate and mixtures of these. Monomeric or oligomeric dimethacrylates based on bisphenol A, in particular the bisphenol-A-ethoxylate(2)dimethacrylate and the bisphenol-A-ethoxylate(4)dimethacrylate, are preferably used. This list should also be considered nonrestrictive.

In some embodiments, the monomer of component B is selected from the group methyl methacrylate, ethyl methacrylate, ethyl acrylate, ethoxyethyl methacrylate, ethoxyethyl acrylate, tetrahydrofurfuryl methacrylate, tetrahydrofurfuryl acrylate, tetraethylenglycol dimethacrylat, tetraethylenglycol diacrylat, isobornyl acrylate and/or isobornyl methacrylate.

In some embodiments, the monomer of component B is ethoxy ethyl methacrylate.

In some embodiments, the component B comprises 2-ethoxyethyl methacrylate or 2-ethoxyethyl acrylate in a concentration of >30%, particularly >40%, by weight in relation to the total weight of the component B.

According to an advantageous further embodiment of the invention, component B comprises at least 5%, preferably at least 10%, particularly preferably at least 20% with respect to the mass of component B of the alkyl acrylate and/or alkyl methacrylate monomers, whereby a good and complete solubility of the polymer of component A is achieved in a particularly simple manner.

In some embodiments, the weight proportion of the monomer in relation to the weight of the liquid component B is >60%.

In some embodiments, the proportion by weight of the monomer relative to the weight of the liquid component B is >70%.

In some embodiments, the proportion by weight of the monomer in relation to the weight of the liquid component B is >80%.

According to a preferred embodiment of the invention, component B comprises at least two different alkyl acrylate and/or alkyl methacrylate monomers, which preferably have a common mass fraction of at least 50%, particularly preferably 70% and most preferably 80% with respect to the mass of component B, whereby the properties of the milling blank can be set in a particularly simple manner and a particularly cost-effective production is possible.

In some embodiments, the liquid component B comprises two monomers, in particular one monomer 2-ethoxyethyl methacrylate.

In some embodiments, the liquid component B comprises two monomers, one monomer being 2-ethoxyethyl methacrylate with a proportion by weight relative to the weight of the liquid component >30%.

In some embodiments, the liquid component B comprises two monomers, one monomer being 2-ethoxyethyl methacrylate in a proportion by weight relative to the weight of the liquid component >40%.

In some embodiments, the component B comprises two monomers: ethoxy ethyl methacrylate and tetraethylenglycol dimethacrylate.

In some embodiments, the at least two different monomers, particularly two monomers, have a common percent by weight of at least 50% with respect to the mass of component B.

According to a further embodiment of the invention, the mass fraction of the plasticizer or respectively flexibilizer is at least 5 percent by weight, preferably at least 10 percent by weight and particularly preferably at least 15 percent by weight. The thermoelastic range of the cured end product can be shifted into the range of the body temperature in a particularly simple manner by means of the flexibilizer. The mass fraction of the flexibilizer can generally refer both to the total mass of the material as well as to the mass of one of the two components A or B. However, the flexibilizer is particularly preferably added to component B or respectively contained in this component before it is mixed with component A. If the mass fraction then only refers to component B, the mass fraction of the flexibilizer with respect to the total mass of the material thus also lies below 5 percent by weight, depending on the mixture ratio of components A and B. A particularly simple production of the milling blank is enabled through the addition of the flexibilizer as an additional component. Most preferably, the material only contains component A as well as component B containing the flexibilizer.

According to an also preferred embodiment of the invention, the flexibilizer is selected from the group of phthalic acid esters like diethylhexylphthalate (DEHP), of the group of aliphatic esters, in particular of the group of the alkylsulfonic acid esters of the phenol, of the group of citric-acid-based flexibilizers like citric acid triethyl ester or particularly preferably 1,2-cyclohexane dicarboxylic acid diisononyl ester, or of the adipic-acid-based flexibilizers like diethylhexyladipate or diethyloctyladipate.

In terms of the invention and in light of the medical-technical range of application, flexibilizers from the group of aliphatic esters, like 1,2-cyclohexane dicarboxylic acid diisononyl ester, are preferred (also see A. Gartner: "Weichmacher (DEHP) in Medizinprodukten" [Plasticizers (DEHP) in Medical Products]; mt-medizintechnik; March 2007; TUEV Media Verlag Köln, pgs. 92-102).

According to a preferred embodiment of the invention, the mass ratio of component A to component B is 0.5-2, preferably 0.65-1.5 and particularly preferably 0.75-1, whereby the desired material properties and a particularly cost-effective production can be achieved at the same time.

In some embodiments, the weight ratio of the component A to the component B is between 0.65 and 1.75.

In some embodiments, the weight ratio of the component A to the component B is between 1 and 1.5.

According to an advantageous further embodiment of the invention, the material has a temperature-dependent memory effect so that the material, in particular a finished dental splint or an ear mold, returns to its original shape after a deformation from heating, in particular to a temperature of 37° C. The temperature-dependent memory effect may be achieved by using a flexibilizer or by using 2-ethoxyethyl methacrylate.

In some embodiments, the component A and/or B comprises a pigment comprising at least one white pigment and optionally a color pigment.

To obtain a tooth-coloured material, at least one white pigment and optionally one or more colour pigments are added. The color pigments can be used to achieve a greyish, yellowish or reddish shade, thus creating the natural color impression of teeth. The addition of the pigment has no negative effect on the thermoelasticity of the material.

A greyish shade can be achieved by adding small amounts of carbon (carbon black pigment). A yellowish shade can be achieved by adding small amounts of $Fe_2O_3$—$H_2O$ and a reddish shade by adding small amounts of $Fe_2O_3$.

In some forms the pigment comprises a white pigment selected from $TiO_2$ (UV 101 White Pigment), and optionally a colour pigment selected from $Fe_2O_3$—$H_2O$ (UV 204 FE Oxide Pigment), $Fe_2O_3$ (UV 302 Oxide Pigment) and carbon (Carbon Black Pigment, UV904).

In some versions the white pigment is $TiO_2$ (UV 101 White Pigment).

In some versions it is selected from $Fe_2O_3$—$H_2O$ (UV 204 FE oxide pigment), $Fe_2O_3$ (UV 302 oxide pigment) and carbon (carbon black pigment).

The pigment can be added to the component A and/or component B. If the pigment is added to both components, the pigment content, based on the sum of the weights of the components A and B, is a maximum of 0.9%. In one embodiment, the pigment content based on the sum of the weights of the components A and B is at least 0.04%. A weight proportion above 0.9% is unnecessary and could adversely affect the polymerization reaction and/or the mechanical properties of the resulting material. In particular, a weight proportion above 0.9% could lead to undesired brittleness of the thermoplastic. Furthermore, the weight percentage of the pigment according to the invention does not have a negative effect on the thermoelasticity of the material.

In some embodiments, the weight proportion of the pigment relative to the sum of the weights of the components A and B is at least 0.06%.

In some embodiments, the proportion by weight of the pigment relative to the sum of the weights of the components A and B is 0.06% to 0.86%.

During the production of the material according to the invention, a translucent plastic material is obtained if the proportion of pigment relative to the liquid component does not exceed 0.15%.

In some embodiments, the weight proportion of the pigment relative to the weight of the liquid component is at least 0.1%.

Opaque materials are obtained if the proportion by weight of the pigment relative to the weight of the component B is equal to or more than 0.15%. A proportion by weight of more than 2% is unnecessary and could adversely affect the polymerization reaction and/or the mechanical properties of the material obtained. In particular, a weight proportion of more than 2% could lead to undesired brittleness of the thermoplastic.

In some embodiments, the weight proportion of the pigment relative to the weight of the liquid component B is 0.15% to 2%.

In some embodiments, the proportion by weight of the pigment in relation to the weight of the liquid component B is 0.15% to 1%.

In some embodiments, the proportion by weight of the pigment relative to the weight of the liquid component is 0.3% to 1%.

During the production of the material according to the invention, a translucent plastic is obtained if the proportion of pigment relative to the powder component A does not exceed 0.1%.

In some embodiments, the weight proportion of the pigment relative to the weight of the powder component A is at least 0.075%.

Opaque plastics are obtained when the proportion by weight of the pigment relative to the weight of the powder component A is equal to or greater than 0.1%. A weight proportion above 1.5% is unnecessary and could have a negative effect on the polymerization reaction and/or the mechanical properties of the material obtained.

In some embodiments, the weight proportion of the pigment relative to the weight of the powder component A is 0.1% to 1.5%.

In some embodiments, the weight proportion of the pigment relative to the weight of the powder component A is 0.1% to 0.75%.

In some embodiments, the proportion by weight of the pigment relative to the weight of the powder component A is 0.2% to 0.75%.

In some embodiments, the pigment comprises 70% to 98% $TiO_2$ white pigment, 5% to 20% $Fe_2O_3$—$H_2O$ (UV 204 FE oxide pigment), 0.5% to 2% $Fe_2O_3$ (UV 302 oxide pigment) and 0.05% to 1% carbon (carbon black pigment), the total being 100%.

In some embodiments, the pigment comprises 75% to 90% $TiO_2$ white pigment, 10% to 20% $Fe_2O_3$—$H_2O$, 0.9% to 1.6% $Fe_2O_3$ and 0.1% to 0.7% carbon, the sum being 100%.

Furthermore, the invention relates to a method for the production of a milling blank produced from a material for medical-technical molded parts, wherein first respectively one component A comprising a poly(alkyl methacrylate) polymer and one component B comprising at least one monomer, in which the poly(alkyl methacrylate) polymer of component A is at least partially, preferably completely, soluble, are produced, followed by the mixing of components A, B and a flexibilizer as well as the subsequent curing of the mixture.

The method according to the invention enables in a particularly simple manner the production of a milling blank, wherein neither particular technical knowledge in the field of polymer sciences nor complex, technical equipment are necessary.

The production of a component is generally understood as any form of provision of this component. This can thereby concern the mixing of several individual components, the preparation of one or more constituents of a component, for example through comminution, but also the mere weighing, measuring or respectively taking from an already prepared individual package of the necessary quantity of the respective component or respectively constituents of a component.

In some embodiments, the method for the production of a milling blank made of a material for medical-technical molded parts, comprises the steps: preparation of a component A according to the embodiments described above, preparation of a component B according to the embodiments described above, mixing of the components A and B to obtain a reaction mix and curing the reaction mix.

According to an advantageous further embodiment of the method, the curing takes place at a temperature between 30° C. and 70° C., preferably between 40° C. and 60° C. and particularly preferably between 45° C. and 55° C. and/or over a duration of 20-90 minutes, preferably 30-60 minutes and particularly preferably 45 minutes, whereby a ready-to-use milling blank can be obtained without great energy expenditure.

According to a further advantageous embodiment of the method, the curing takes place in a pressure pot at an internal pressure of at least 3 bar, preferably at least 5 bar, whereby a speedy and blister-free curing is ensured.

BRIEF DESCRIPTION OF THE DRAWINGS

An exemplary embodiment of the invention is explained in greater detail below.

(FIG. 2A) and 37° C. (FIG. 2B) according to testing requirements given in ISO 178. The flexural strength was recorded for each test row in MPa. Average values were calculated (68,29222817 MPa at 23° C. and 58,57682411 MPa at 37° C.).

DETAILED DESCRIPTION

Terms and Definitions

Figure 1:
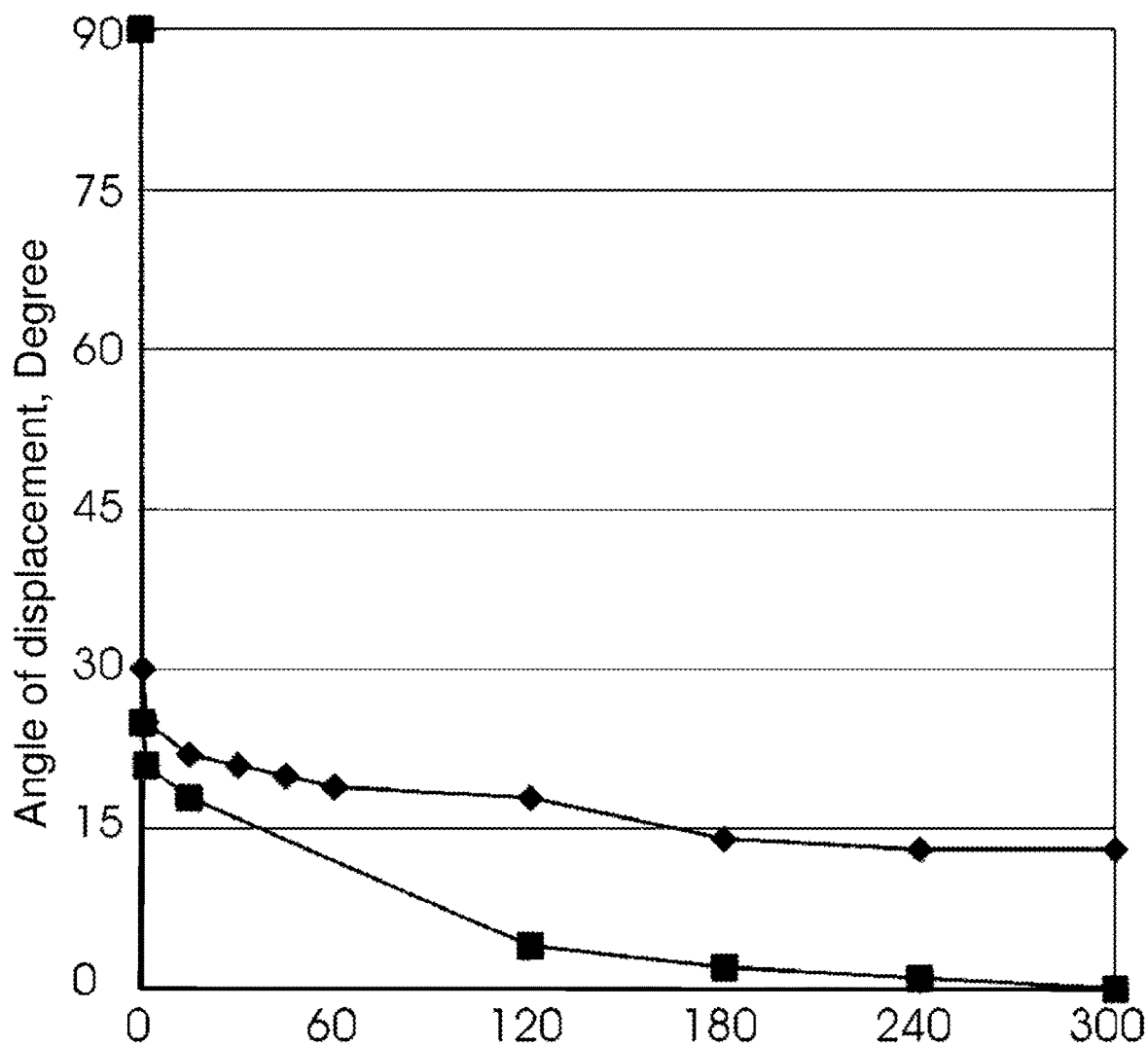
FIG. 1 shows a ime-dependent relaxation of test bodies (5×5×80 mm) at 23° C. (♦) and at 37° C. (■)
Figure 2A:
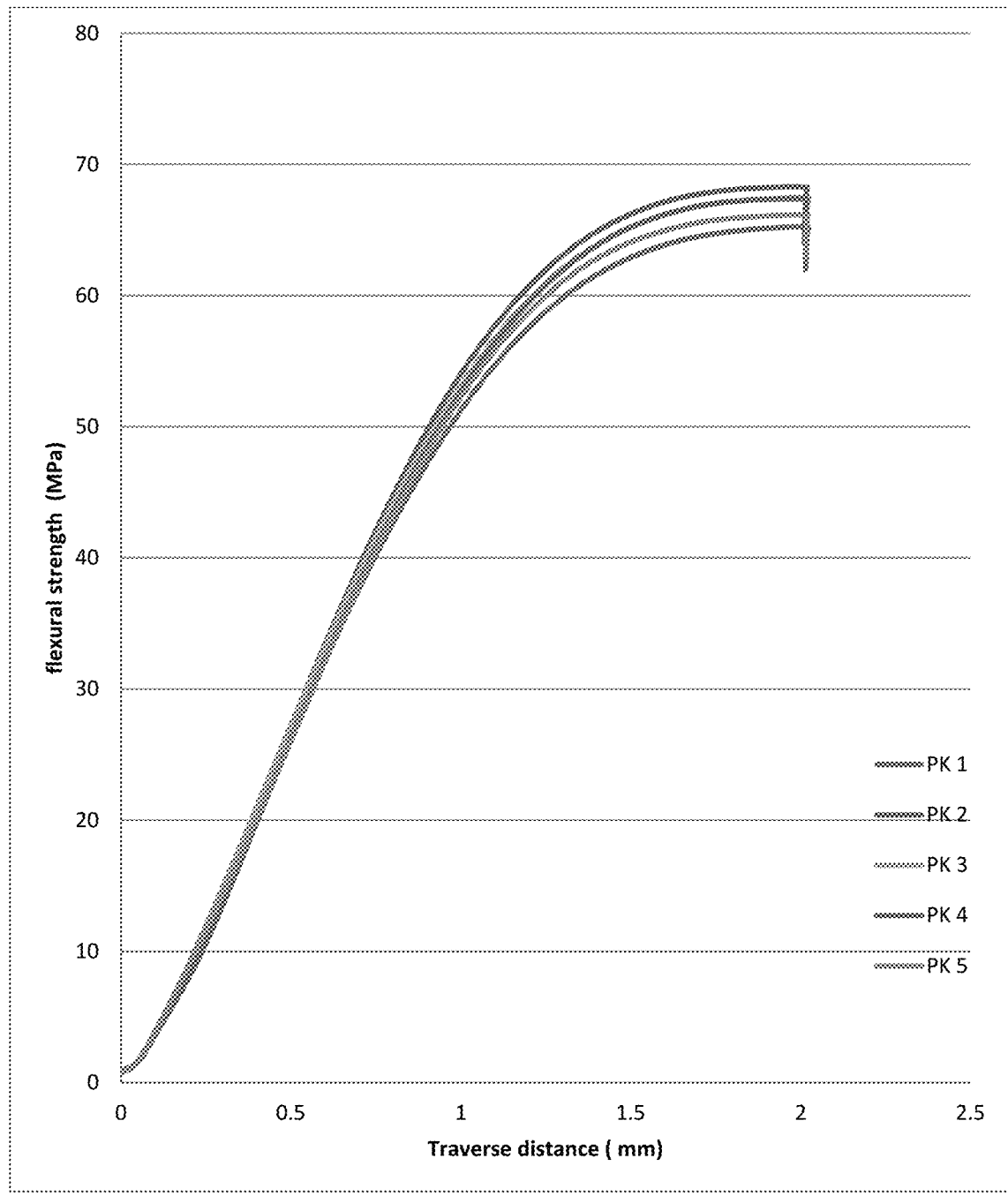
FIGS. 2A and 2B show the flexural strength of a material as described in experiment 13. The results show a thermoelastic behavior of the material. Test specimen: 4×4×25 mm (n=10), test equipment: universal testing machine (Galdabini Qasar 2.5 kN), test method: 3 point bending test acc. to. ISO 178 (flexural strength, MPa), loading pin (radius 5), supporting pins (radius 2), support span (20 mm), traverse speed 10 mm/min. Ten test specimen per test were measured at 23° C.
Figure 2B:
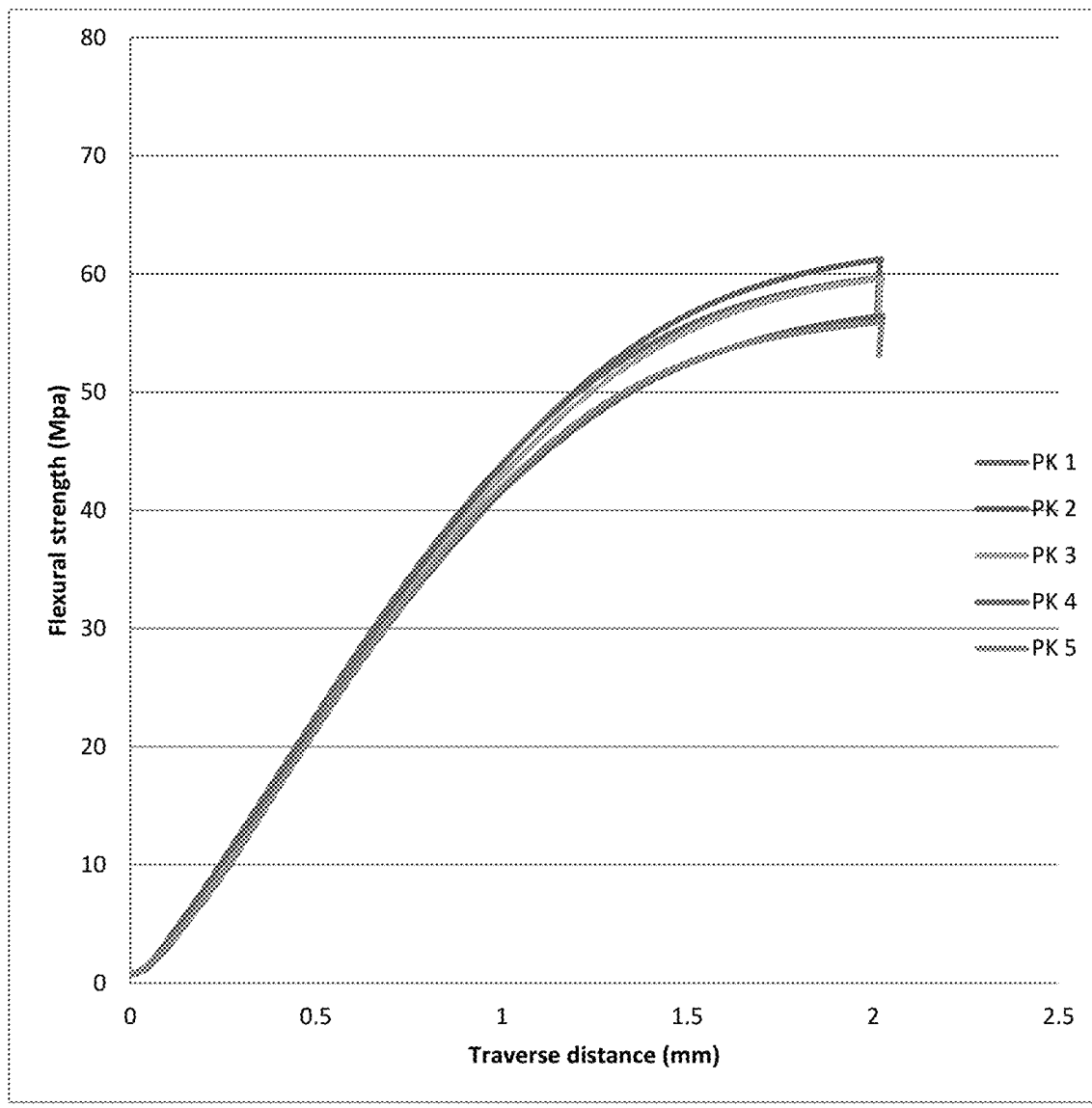

The term copolymer refers to a polymer made from at least two different monomers. For example, a PEMA-PMMA copolymer (polyethyl methacrylate-polymethyl methacrylate copolymer) consists of ethyl methacrylate and methyl methacrylate subunits.

The term alkyl refers to a saturated linear or branched hydrocarbon chain. A $C_{1-4}$ alkyl denotes a hydrocarbon chain comprising 1, 2, 3 or 4 carbon atoms. Examples of $C_{1-4}$ alkyls are methyl, ethyl, propyl, isopropyl, n-butyl, 2-methylpropyl, tert-butyl.

The term $C_{1-4}$ alcohol refers to a $C_{1-4}$ alkyl which is substituted with one or more —OH groups. Examples include —$CH_2OH$, —$(CH_2)_2OH$, —$(CH_2)_3OH$, —$CH_2CH(OH)CH_3$, —$(CH_2)_4OH$, —$CH(CH_2OH)CH_2CH_3$, —$CH_2CH(CH_2OH)CH_3$, —$CH(OH)(CH_2)_2OH$, —$CH_2CH(OH)CH_2OH$, —$CH_2CH(OH)(CH_2)_2OH$ and —$CH_2CH(CH_2OH)_2$.

The term cycloalkyl refers to a saturated mono- or polycyclic hydrocarbon compound. Monocyclic hydrocarbon compounds form a ring structure, e.g. cyclohexyl (—$C_6H_{11}$). Polycyclic hydrocarbon compounds comprise hydrocarbon compounds which form several rings, e.g. isobornyl or tricyclodecyl. A $C_{3-18}$ cycloalkyl refers to a mono- or polycyclic hydrocarbon compound comprising 3 to 18 carbon atoms. Cycloalkyls may be substituted with one or more $C_{1-4}$ alkylene, e.g. tricyclodecane dimethanol The term initiator (also referred to as catalyst) refers to molecules that form a radical and thus start the polymerisation reaction. The radical formation is catalyzed by so-called activators. For example, copper ions of the activator copper(II) acetylacetonate accelerate the radical formation of barbituric acid derivatives. The radical formed in the barbituric acid derivative attacks, for example, a double bond of an alkyl methacrylate monomer.

The term activator (also referred to as catalyst) refers to chemical compounds, an increase in temperature, light or high-energy radiation which stimulate an initiator to form a radical. For example, peroxide compounds can be stimulated thermally or photochemically to form radicals.

The term thermoelasticity or thermomemory effect refers to the property of the material according to the invention to return to its original shape after deformation. This is achieved in particular by heating to a temperature between 35° C. and 37° C.

The term interpenetrating network refers to a polymer network comprising two or more networks which are at least partially cross-linked at the molecular level, but not covalently connected to each other. The networks cannot be separated unless chemical bonds are broken. For example, the polymers of the powder component form one network and the polymers formed from the monomers of the liquid component form another network.

The unit Shore is used to measure Shore indentation hardness. In this measurement, the penetration depth of a pin into the material is measured in mm. The Shore indentation hardness (D) is determined by using a needle that tapers at a 30° angle and has a spherical tip with a diameter of 0.2 millimetres. For this purpose, the needle is pressed into the material for 15 seconds with a contact weight of 5 kg and the penetration depth is determined. A penetration depth of 0 mm corresponds to 100 Shore and a penetration depth of 2.5 mm corresponds to 0 Shore.

For the production of a milling blank for the production of medical-technical molded parts, a material produced from two components A and B is used, the compositions of which are shown in the below table (experiment 1).

| | Mass fraction, % |
|---|---|
| Component A | |
| Poly(ethyl methacrylate) | 99 |
| 1-benzyl-5-phenylbarbituric acid | 1 |
| Component B | |
| Ethoxyethyl methacrylate | 49.73 |
| Tetrahydrofurfuryl methacrylate | 33.2 |
| 1,2-cyclohexane dicarboxylic acid diisononyl ester | 16.5 |
| Dilauryl dimethyl ammonium chloride | 0.4 |
| 1% copper(II)-acetylacetonate solution in MMA | 0.17 |

The two components according to the invention are mixed in a ratio A:B=100:75 with a spatula in a beaker and then cured in a pressure pot (Polymax, by company Dreve) at 50° C. and 6 bar for 45 minutes blister-free in a duplicating silicone mold. A milling blank with a diameter of 98 mm and a thickness of 18 mm is thereby obtained.

Test bodies of the dimension 5×5×80 mm are then generated from this milling blank by means of a milling machine (Otofab 1, by company pro3dure). Alternatively, medical-technical molded parts are manufactured based on three-dimensional data.

The test bodies are then tempered at 23° C. and at 37° C. for 24 h and then bent in the middle by 90°. The relaxation of the angle is subsequently recorded depending on the time at the two aforementioned temperatures in order to document the temperature-dependent memory effect. The results are shown in FIG. 1. It is thereby shown that the formulation according to the invention has a temperature-dependent memory effect, by means of which mold bodies, which are deformed at room temperature, almost return to their original shape from body heat.

Further examples described in more detail below were prepared as follows: The components A and B were mixed in a reaction vessel and incubated for 30 min at 50° C. in a water bath at a pressure of 2 to 4 bar. The mixing ratio of the powder component weight to the liquid component weight was 10:7.5.

The flexibility was determined at room temperature (RT) and at 37° C. Furthermore, the Shore indentation hardness (D), the maximum force, the Modulus of elasticity (E-Modulee, Young's Moduleus) and the resetting at 23° C. and 37° C. were determined. The flexibility was determined in a 3-point bending test according to ISO178. The Shore hardness was determined according to ISO 7619-1.

Experiments 2 to 4 demonstrate that a thermomemory effect can be achieved by using 2-ethoxyethyl methacrylate without the use of a flexibilizer. Omitting 2-ethoxyethyl methacrylate results in material without a thermomemory effect (experiments 5 to 12).

EXPERIMENT 2

Powder Component A

| 1. | Polyethylmethacrylate | CAS 9003-42-3 | 99% |
| 2. | 1-Benzyl-5-phenylbarbituric acid | CAS 276-940-2 | 1% |

Liquid Component B

| 1. | 2-Ethoxyethylmethacrylate | CAS 2370-63-0 | 98.5% |
| 2. | Tetraethylenglycoldimethacrylate | CAS 109-17-1 | 0.9% |
| 3. | Dilauryldimethylammoniumchloride | CAS 3401-74-9 | 0.4% |
| 4. | Copper(II)acetylacetonate (1% solution in methylmethacrylate) | CAS 13395-16-9 | 0.2% |

Results

| 1. | Color | | colorless |
| 2. | Elasticty | | elastic |
| 3. | Shore indentation hardness, D at 23° C. | | 67 |
| 4. | Shore indentation hardness, D at 37° C. | | 62 |
| 5. | Mechanics | | |
| | 5.1 maximal force, N at 23° C. | | 122 |
| | 5.2 maximal force, N at 37° C. | | 77 |
| | 5.3 E-Moduleee, MPa at 23° C. | | 434 |
| | 5.4 E-Moduleee, MPa at 37° C. | | 255 |
| 6. | Resetting, % after 60 sec at 23° C. | | 73 |
| 7. | Resetting, % after 60 sec at 37° C. | | 80 |

EXPERIMENT 3

Powder Component A

| 1. | Polyethylmethacrylate | CAS 9003-42-3 | 99% |
| 2. | Dibenzoylperoxide | CAS 94-36-0 | 1% |

Liquid Component B

| 3. | 2-Ethoxyethylmethacrylate | CAS 2370-63-0 | 98.5% |
| 4. | Tetraethylenglycoldimethacrylate | CAS 109-17-1 | 0.9% |
| 5. | Dilauryldimethylammoniumchloride | CAS 3401-74-9 | 0.4% |
| 6. | Copper(II)acetylacetonate (1% solution in methylmethacrylate) | CAS 13395-16-9 | 0.2% |

Results

| 1. | Color | | colorless |
| 2. | Elasticty | | elastic |
| 3. | Shore indentation hardness, D at 23° C. | | 64 |
| 4. | Shore indentation hardness, D at 37° C. | | 60 |
| 5. | Mechcanics | | |
| | 5.1 Maximal force, N at 23° C. | | 129 |
| | 5.2 Maximal force, N at 37° C. | | 81 |
| | 5.3 E-Moduleee, MPa at 23° C. | | 445 |
| | 5.4 E-Moduleee, MPa at 37° C. | | 265 |
| 6. | Resetting, % after 60 sec at 23° C. | | 71 |
| 7. | Resetting, % after 60 sec at 37° C. | | 78 |

EXPERIMENT 4

Powder Component A

| 1. | Polyethylmethacrylate | CAS 9003-42-3 | 99% |
| 2. | Dibenzoylperoxide | CAS 94-36-0 | 1% |

Liquid Component B

| 1. | 2-Ethoxyethylmethacrylate | CAS 2370-63-0 | 97.8% |
|---|---|---|---|
| 2. | Tetraethylenglycoldimethacrylate | CAS 109-17-1 | 0.9% |
| 3. | Dilauryldimethylammoniumchloride | CAS 3401-74-9 | 0.4% |
| 4. | Copper(II)acetylacetonate (1% solution in methylmethacrylate) | CAS 13395-16-9 | 0.2% |
| 5. | Pigments for tooth color A3 (see table below) | | 0.7% |

| Pigments | Color A3 (%) |
|---|---|
| UV 101 (white pigment) | 84.03 |
| UV 204 (FE oxide pigment) | 14.4 |
| UV 302 (FE oxide pigment) | 1.35 |
| UV 904 (carbon black pigment) | 0.22 |

Results

| 1. | Color | Tooth color A3 |
|---|---|---|
| 2. | Elasticty | elastic |
| 3. | Shore indentation hardness, D at 23° C. | 65 |
| 4. | Shore indentation hardness, D at 37° C. | 58 |
| 5. | Mechanics | |
| | 5.1 Maximal force, N at 23° C. | 124 |
| | 5.2 Maximal force, N at 37° C. | 82 |
| | 5.3 E-Moduleee, MPa at 23° C. | 454 |
| | 5.4 E-Moduleee, MPa at 37° C. | 256 |
| 6. | Resetting, % after 60 sec at 23° C. | 70 |
| 7. | Resetting, % after 60 sec at 37° C. | 79 |

EXPERIMENT 5

Powder Component A

| 1. | Polyethylmethacrylate | CAS 9003-42-3 | 99% |
|---|---|---|---|
| 2. | Dibenzoylperoxide | CAS 94-36-0 | 1% |

Liquid Component B

| 1. | Tetrahydrofurfurylmethacrylate | CAS 2455-24-5 | 66.6% |
|---|---|---|---|
| 2. | Isodecylmethacrylate | CAS 29964-84-9 | 33.3% |
| 3. | N,N-Dimethyl-p-toluidin | CAS 99-97-8 | 0.1% |

Results

| 1. | Color | yellowish |
|---|---|---|
| 2. | Elasticity | brittle |
| 3. | Shore indentation hardness, D at 23° C. | 82 |
| 4. | Shore indentation hardness, D at 37° C. | 78 |
| 5. | Mechanics | |
| | 5.1 Maximal force, N at 23° C. | 133 |
| | 5.2 Maximal force, N at 37° C. | 110 |
| | 5.3 E-Modulee, MPa at 23° C. | 744 |
| | 5.4 E-Modulee, MPa at 37° C. | 639 |
| 6. | Resetting, % after 60 sec at 23° C. | N.A. - Fracture |
| 7. | Resetting, % after 60 sec at 37° C. | N.A. - Fracture |

EXPERIMENT 6

Powder Component A

| 1. | olyethylmethacrylate | CAS 9003-42-3 | 99% |
|---|---|---|---|
| 2. | Dibenzoylperoxide | CAS 94-36-0 | 1% |

Liquid Component B

| 1. | Tetrahydrofurfurylmethacrylate | CAS 2455-24-5 | 86.6% |
|---|---|---|---|
| 2. | Isodecylmethacrylate | CAS 29964-84-9 | 13.3% |
| 3. | N,N-Dimethyl-p-toluidin | CAS 99-97-8 | 0.1% |

Results

| 1. | Color | yellowish |
|---|---|---|
| 2. | Elasticity | brittle |
| 3. | Shore indentation hardness, D at 23° C. | 80 |
| 4. | Shore indentation hardness, D at 37° C. | 74 |
| 5. | Mechanics | |
| | 5.1 Maximal force, N at 23° C. | 125 |
| | 5.2 Maximal force, N at 37° C. | 138 |
| | 5.3 E-Modulee, MPa at 23° C. | 1042 |
| | 5.4 E-Modulee, MPa at 37° C. | 926 |
| 6. | Resetting, % after 60 sec at 23° C. | N.A. - Fracture |
| 7. | Resetting, % after 60 sec at 37° C. | N.A. - Fracture |

EXPERIMENT 7

Powder Component A

| 1. | Polyethylmethacrylate | CAS 9003-42-3 | 99% |
|---|---|---|---|
| 2. | Dibenzoylperoxide | CAS 94-36-0 | 1% |

Liquid Component B

| 1. | Tetrahydrofurfurylmethacrylate | CAS 2455-24-5 | 86.6% |
|---|---|---|---|
| 2. | Isodecylmethacrylate | CAS 29964-84-9 | 13.3% |
| 3. | N,N-Dihydroxyethyl-p-toluidin | CAS 3077-12-1 | 0.1% |

Results

| 1. | Color | almost colorless |
|---|---|---|
| 2. | Elasticity | brittle |
| 3. | Shore indentation hardness, D at 23° C. | 80 |
| 4. | Shore indentation hardness, D at 37° C. | 75 |
| 5. | Mechanics | |
| | 5.1 Maximal force, N at 23° C. | 119 |
| | 5.2 Maximal force, N at 37° C. | 128 |
| | 5.3 E-Modulee, MPa at 23° C. | 996 |
| | 5.4 E-Modulee, MPa at 37° C. | 896 |
| 6. | Resetting, % after 60 sec at 23° C. | N.A. - Fracture |
| 7. | Resetting, % after 60 sec at 37° C. | N.A. - Fracture |

EXPERIMENT 8

Powder Component A

| 1. | Polyethylmethacrylate | CAS 9003-42-3 | 99% |
|---|---|---|---|
| 2. | 1-Benzyl-5-phenylbarbituric acid | CAS 276-940-2 | 1% |

Liquid Component B

| 1. | Tetrahydrofurfurylmethacrylate | CAS 2455-24-5 | 86.2% |
|---|---|---|---|
| 2. | Isodecylmethacrylate | CAS 29964-84-9 | 13.3% |
| 3. | Dilauryldimethylammoniumchloride | CAS 3401-74-9 | 0.4% |
| 4. | Copper(II)acetylacetonate (1% solution in methylmethacrylate) | CAS 13395-16-9 | 0.1% |

Results

| 1. | Color | colorless |
|---|---|---|
| 2. | Elasticity | brittle |
| 3. | Shore indentation hardness, D at 23° C. | 80 |
| 4. | Shore indentation hardness, D at 37° C. | 74 |
| 5. | Mechanics | |
| | 5.1 Maximal force, N at 23° C. | 114 |
| | 5.2 Maximal force, N at 37° C. | 124 |
| | 5.3 E-Modulee, MPa at 23° C. | 987 |
| | 5.4 E-Modulee, MPa at 37° C. | 963 |
| 6. | Resetting, % after 60 sec at 23° C. | N.A. - Fracture |
| 7. | Resetting, % after 60 sec at 37° C. | N.A. - Fracture |

EXPERIMENT 9

Powder Component A

| 1. | Polyethylmethacrylate | CAS 9003-42-3 | 98.5% |
|---|---|---|---|
| 2. | 1-Benzyl-5-phenylbarbituric acid | CAS 276-940-2 | 1.5% |

Liquid Component B

| 1. | Tetrahydrofurfurylmethacrylat | CAS 2455-24-5 | 79.5% |
|---|---|---|---|
| 2. | Tetraethylenglycoldimethacrylat | CAS 109-17-1 | 20% |
| 3. | Dilauryldimethylammoniumchlorid | CAS 3401-74-9 | 0.4% |
| 4. | Copper(II)acetylacetonat (1% solution in methylmethacrylate) | CAS 13395-16-9 | 0.1% |

Results

| 1. | Color | colorless |
|---|---|---|
| 2. | Elasticity | brittle |
| 3. | Shore indentation hardness, D at 23° C. | 81 |
| 4. | Shore indentation hardness, D at 37° C. | 79 |
| 5. | Mechanics | |
| | 5.1 Maximal force, N at 23° C. | 128 |
| | 5.2 Maximal force, N at 37° C. | 127 |
| | 5.3 E-Modulee, MPa at 23° C. | 1091 |
| | 5.4 E-Modulee, MPa at 37° C. | 1051 |
| 6. | Resetting, % after 60 sec at 23° C. | N.A. - Fracture |
| 7. | Resetting, % after 60 sec at 37° C. | N.A. - Fracture |

EXPERIMENT 10

Powder Component A

| 1. | Polyethylmethacrylate | CAS 9003-42-3 | 98.5% |
|---|---|---|---|
| 2. | 1-Benzyl-5-phenylbarbituric acid | CAS 276-940-2 | 1.5% |

Liquid Component B

| 1. | Tetrahydrofurfurylmethacrylate | CAS 2455-24-5 | 99.5% |
|---|---|---|---|
| 2. | Dilauryldimethylammoniumchloride | CAS 3401-74-9 | 0.4% |
| 3. | Copper(II)acetylacetonate (1% solution in methylmethacrylate) | CAS 13395-16-9 | 0.1% |

Results

| 1. | Color | colorless |
|---|---|---|
| 2. | Elasticity | brittle |
| 3. | Shore indentation hardness, D at 23° C. | 79 |
| 4. | Shore indentation hardness, D at 37° C. | 73 |
| 5. | Mechanics | |
| | 5.1 Maximal force, N at 23° C. | 114 |
| | 5.2 Maximal force, N at 37° C. | 165 |
| | 5.3 E-Modulee, MPa at 23° C. | 1024 |
| | 5.4 E-Modulee, MPa at 37° C. | 1084 |
| 6. | Resetting, % after 60 sec at 23° C. | N.A. - Fracture |
| 7. | Resetting, % after 60 sec at 37° C. | N.A. - Fracture |

EXPERIMENT 11

Powder Component A

| 1. | Polyethylmethacrylate | CAS 9003-42-3 | 98.5% |
|---|---|---|---|
| 2. | 1-Benzyl-5-phenylbarbituric acid | CAS 276-940-2 | 1.5% |

Liquid Component B

| 1. | Tetrahydrofurfurylmethacrylate | CAS 2455-24-5 | 89.5% |
|---|---|---|---|
| 2. | Hexandioldiacrylate | CAS 13048-33-4 | 10% |
| 3. | Dilauryldimethylammoniumchloride | CAS 3401-74-9 | 0.4% |
| 4. | Copper(II)acetylacetonate (1% solution in methylmethacrylate) | CAS 13395-16-9 | 0.1% |

Results

| 1. | Color | colorless |
|---|---|---|
| 2. | Elasticity | brittle |
| 3. | Shore indentation hardness, D at 23° C. | 76 |
| 4. | Shore indentation hardness, D at 37° C. | 75 |
| 5. | Mechanics | |
| | 5.1 Maximal force, N at 23° C. | 115 |
| | 5.2 Maximal force, N at 37° C. | 114 |
| | 5.3 E-Modulee, MPa at 23° C. | 1075 |
| | 5.4 E-Modulee, MPa at 37° C. | 1005 |
| 6. | Resetting, % after 60 sec at 23° C. | N.A. - Fracture |
| 7. | Resetting, % after 60 sec at 37° C. | N.A. - Fracture |

EXPERIMENT 12

Powder Component A

| 1. | Polyethylmethacrylate | CAS 9003-42-3 | 73.5% |
|---|---|---|---|
| 2. | Polymethylmethacrylate | CAS 9011-14-7 | 25% |
| 3. | 1-Benzyl-5-phenylbarbituric acid | CAS 276-940-2 | 1.5% |

Liquid Component B

| 1. | Tetrahydrofurfurylmethacrylate | CAS 2455-24-5 | 89.5% |
|---|---|---|---|
| 2. | Isodecylmethacrylate | CAS 29964-84-9 | 10% |
| 3. | Dilauryldimethylammoniumchloride | CAS 3401-74-9 | 0.4% |
| 4. | Copper(II)acetylacetonate (1% solution in methylmethacrylate) | CAS 13395-16-9 | 0.2% |

Results

| 1. | Color | colorless |
|---|---|---|
| 2. | Elasticity | brittle |
| 3. | Shore indentation hardness, D at 23° C. | 77 |
| 4. | Shore indentation hardness, D at 37° C. | 76 |
| 5. | Mechanics | |
| | 5.1 Maximal force, N at 23° C. | 133 |
| | 5.2 Maximal force, N at 37° C. | 146 |
| | 5.3 E-Modulee, MPa at 23° C. | 999 |
| | 5.4 E-Modulee, MPa at 37° C. | 1003 |
| 6. | Resetting, % after 60 sec at 23° C. | N.A. - Fracture |
| 7. | Resetting, % after 60 sec at 37° C. | N.A. - Fracture |

EXPERIMENT 13

| Rohstoff/Edukt | Formulation % |
|---|---|
| Powder component A | |
| Polyethylmethacrylate | 99 |
| 1-Benzyl-5-phenlybarbituric acid | 1 |
| Liquid component B | |
| Ethoxyethylmethacrylate | 59.66 |
| Tetrahydrofurfurylmethacrylate (THFMA/M151) | 39.77 |
| 1,2-cyclohexane dicarboxylic acid diisononyl ester | 0 |
| Dilauryldimethyl-ammoniumchloride | 0.4 |
| Copper(II)-2,4-pentan-dionate 0.1% in MMA | 0.17 |
| Tempo | 0.002 |

We claim:

1. A milling blank for producing medical-technical molded parts made from a material produced from at least two components, wherein
    a) a first component A comprises
        a poly(alkyl methacrylate) polymer, a poly(alkyl acrylate) polymer, a poly(cycloalkyl methacrylate) polymer, a poly (cycloalkyl acrylate) polymer, or a copolymer made of at least two different monomers selected from an alkyl methacrylate, an alkyl acrylate, a cycloalkyl methacrylate and a cycloalkyl acrylate, wherein the polymer or monomer of the first component A may optionally be substituted by at least one $C_{1-4}$ alkyl, —OH or $C_{1-4}$ alcohol; and wherein
    b) a second component B comprises
        at least one monomer, in which the polymer or copolymer of component A is at least partially soluble, wherein the monomer is selected from a compound of formula 1,

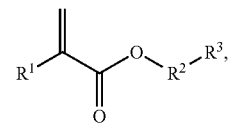

(1)

wherein
$R^1$ is —H or —CH$_3$,
$R^2$ is selected from,

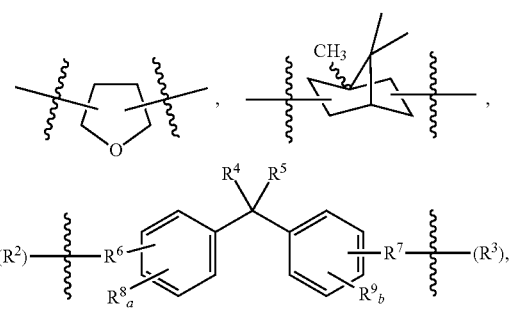

$C_{1-10}$-alkyl, and —[(CH$_2$)$_m$—O—]$_n$—(CH$_2$)$_r$—, wherein
R$^4$ and R$^5$ are independently selected from H, —C$_{1-4}$-alkyl, —CF$_3$, phenyl, or
R$^4$ and R$^5$ form a ring comprising a hydrocarbon chain comprising 4 to 8 carbon atoms,
R$^6$ is selected from —[(CH$_2$)$_p$—O—]$_q$—,
R$^7$ is selected from —O—[(CH$_2$)$_v$—O—]$_w$—,
R$^8{}_a$ and R$^9{}_b$ are independently selected from —C$_{1-4}$-alkyl, phenyl,
m, n, p, q, r, v and w are independently selected from 1, 2, 3 and 4,
a is 0 or 1,
b is 0 or 1, and
R$^3$ is —H, acrylat or methacrylate;
characterized in that
at least one monomer of the second component B is 2-ethoxyethyl methacrylate or 2-ethoxyethyl acrylate.

2. The milling blank according to claim 1, wherein
the polymer is selected from poly-C$_{1-10}$-alkyl methacrylate, poly-C$_{1-10}$-alkyl acrylate, poly-C$_{3-18}$-cycloalkyl methacrylate and poly-C$_{3-18}$-cycloalkyl acrylate, and/or
the copolymer is made of at least two monomers selected from C$_{1-10}$-alkyl methacrylate, C$_{1-10}$-alkyl acrylate, C$_{3-18}$-cycloalkyl methacrylate and C$_{3-18}$-cycloalkyl acrylate.

3. The milling blank according to claim 1, wherein component A comprises a poly(ethyl methacrylate) polymer (PEMA) or a poly(ethyl methacrylate) poly(methyl methacrylate) copolymer (PEMA-PMMA).

4. The milling blank according to claim 1, wherein component A is made up of at least 50%, with respect to the mass of component A of poly(ethyl methacrylate) polymer poly(alkyl acrylate) polymer, poly(cycloalkyl methacrylate) polymer, poly (cycloalkyl acrylate) polymer or copolymer.

5. The milling blank according to claim 1, wherein a mass fraction of at least 25% of the polymer powder is made of poly(ethyl methacrylate) polymer or poly(ethyl methacrylate) poly(methyl methacrylate) copolymer.

6. The milling blank according to claim 1, wherein component A comprises a catalyst, wherein the catalyst is present in a concentration of 0.25-1 percent by weight in relation to the mass of the component A.

7. The milling blank according to claim 5, wherein the catalyst is selected from the group consisting of an organic peroxide, barbituric acid, barbituric acid derivative and combinations thereof.

8. The milling blank according to claim 1, wherein the e monomer of component B is selected from the group methyl methacrylate, ethyl methacrylate, ethyl acrylate, ethoxyethyl methacrylate, ethoxyethyl acrylate, tetrahydrofurfuryl methacrylate, tetrahydrofurfuryl acrylate, tetraethylenglycol dimethacrylat, tetraethylenglycol diacrylat, isobornyl acrylate and/or isobornyl methacrylate.

9. The milling blank according to claim 8, wherein the monomer of component B is ethoxy ethyl methacrylate.

10. The milling blank according to claim 1, wherein component B comprises 2-ethoxyethyl methacrylate or 2-ethoxyethyl acrylate in a concentration of >30% by weight in relation to the total weight of the component B.

11. The milling blank according to claim 1, wherein component B comprises at least 5% with respect to the mass of component B of the monomer.

12. The milling blank according to claim 1, wherein component B comprises at least two different monomers.

13. The milling blank according to claim 12, wherein the component B comprises ethoxy ethyl methacrylate and tetraethylenglycol dimethacrylate.

14. The milling blank according to claim 12, wherein the at least two different monomers have a common percent by weight of at least 50% with respect to the mass of component B.

15. The milling blank according to claim 1, wherein the mass ratio of components A and B is 0.5-2.

16. The milling blank according to claim 1, wherein the component A and/or B comprises a pigment comprising at least one white pigment and optionally a color pigment.

17. A method for the production of a milling blank made of a material for medical-technical molded parts, comprising the steps: preparation of a component A according to claim 1, preparation of a component B according to claim 1, mixing of the components A and B to obtain a reaction mix and curing the reaction mix.

18. The method for the production of a milling blank according to claim 17, wherein curing takes place at a temperature between 30° C. and 70° C. and/or over a duration of 20-90 minutes.

19. The method for the production of a milling blank according to claim 17, wherein the curing takes place in a pressure pot at an internal pressure of at least 2 bar.

20. The method for the production of a milling blank according to claim 17, wherein heating comprises heating to a temperature of 37° C.

* * * * *